United States Patent
Hahn (10) Patent No.: US 12,429,025 B2
(45) Date of Patent: Sep. 30, 2025

(54) WIND TURBINE BLADE AND A METHOD FOR MANUFACTURING A WIND TURBINE BLADE

(71) Applicant: Vestas Wind Systems A/S, Aarhus (DK)

(72) Inventor: Frank Hoelgaard Hahn, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/724,389

(22) PCT Filed: Dec. 21, 2022

(86) PCT No.: PCT/DK2022/050299
§ 371 (c)(1),
(2) Date: Jun. 26, 2024

(87) PCT Pub. No.: WO2023/126042
PCT Pub. Date: Jul. 6, 2023

(65) Prior Publication Data
US 2025/0067244 A1    Feb. 27, 2025

(30) Foreign Application Priority Data
Dec. 29, 2021 (DK) .......................... PA 2021 70677

(51) Int. Cl.
*F03D 1/06* (2006.01)
(52) U.S. Cl.
CPC ........ *F03D 1/0684* (2023.08); *F05B 2230/20* (2013.01); *F05B 2230/60* (2013.01); *F05B 2240/301* (2013.01)
(58) Field of Classification Search
CPC ................ F03D 1/0684; F05B 2230/20; F05B 2230/60; F05B 2240/301
See application file for complete search history.

(56) References Cited

U.S. PATENT DOCUMENTS

| | | | |
|---|---|---|---|
| 2015/0316028 A1* | 11/2015 | Brekenfeld | F03D 1/0675 156/196 |
| 2018/0142670 A1 | 5/2018 | Garm | |
| 2018/0250895 A1* | 9/2018 | Wardropper | B29D 99/0028 |

FOREIGN PATENT DOCUMENTS

| | | | | |
|---|---|---|---|---|
| CN | 110905719 A | * | 3/2020 | |
| GB | 2497578 A | * | 6/2013 | B29C 70/84 |

(Continued)

OTHER PUBLICATIONS

Danish Patent and Trademark Office, technical examination issued in corresponding DK Application No. PA 2021 70677, dated Jun. 3, 2022.

(Continued)

*Primary Examiner* — Courtney D Heinle
*Assistant Examiner* — Ryan C Clark
(74) *Attorney, Agent, or Firm* — Wood Herron & Evans LLP (57) ABSTRACT

A wind turbine blade with shear distortion resistance includes a root end and a tip end, a leading edge and a trailing edge, and a suction side shell and a pressure side shell between which there are first and second shear webs. The first and second shear webs are arranged in a V-configuration in a chordwise cross section of the blade, whereby at least one of the first and second shear webs is non-orthogonal to the chord line, and the first and second shear webs are non-parallel. A method of manufacturing the wind turbine blade includes providing respective upper and lower mould halves for the blade and interconnecting the first and second shear webs by an elastic structure biasing the shear webs towards one another before closing the mould.

18 Claims, 5 Drawing Sheets

(56) References Cited

FOREIGN PATENT DOCUMENTS

| | | |
|---|---|---|
| JP | 2013087632 A | 5/2013 |
| WO | 2009155921 A1 | 12/2009 |

OTHER PUBLICATIONS

International Searching Authority, International Search Report and Written Opinion issued in corresponding PCT Application No. PCT/DK2022/050299, dated Mar. 30, 2023.

* cited by examiner

WIND TURBINE BLADE AND A METHOD FOR MANUFACTURING A WIND TURBINE BLADE

TECHNICAL FIELD

The present invention relates to a wind turbine blade, particularly a blade for a horizontal-axis wind turbine, and a method for manufacturing the blade. The blade comprises shear webs extending internally within the blade between suction side and pressure side shells. The invention aims at mitigating shear distortion conferred by the combination of edgewise loads, including gravity-induced loads, and flapwise loads mainly resulting from aerodynamic forces.

BACKGROUND OF THE INVENTION

Wind turbine blades are typically provided with internal load bearing structures, such as spars or shear webs attaching to suction and pressure side shells of the blade. The shells are typically made from fibre-reinforced resins. During manufacture of the blade its suction and pressure side shells are commonly laid up in respective mould halves which are adhered together along their leading and trailing edges.

Most modern horizontal-axis wind turbines comprise three blades forming a rotor of the wind turbine mounted to a driving shaft at a hub of the rotor. In use horizontal axis wind turbine blades are subjected to aerodynamic loads in a flapwise direction conferring a driving moment at the hub to drive the shaft and in turn a generator for converting mechanical energy into electrical energy. In addition to the flapwise loads, wind turbine blades are subject to edgewise loads in a direction substantially perpendicular to the flapwise load as well as to torsional loads.

Figure 3:
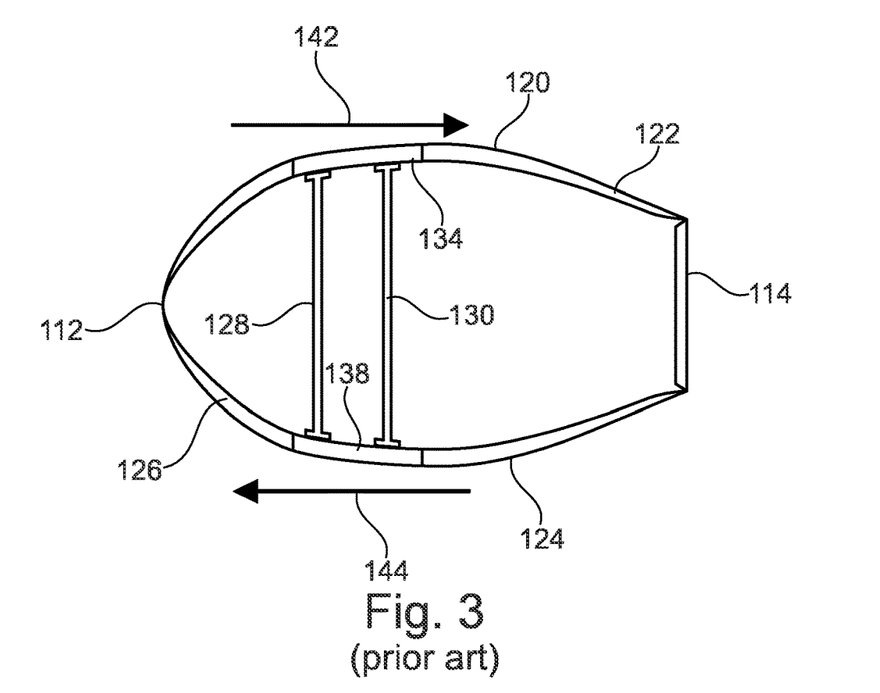
FIG. 3 illustrates a prior art configuration of a chordwise cross section of a wind turbine blade.

In operation the flapwise and edgewise loads generate transverse shear forces as generally indicated by arrows 142 and 144 in FIG. 3. Such transverse shear forces occur in consequence of intrinsic asymmetries of the blade geometry and its mass distribution. The transverse shear forces confer bending moments in the chordwise cross sectional plane illustrated in FIG. 3, whereby spars or shear webs may be distorted. Further, peeling stresses are conferred at adhesive bond lines between shear webs and the blade shells. This in turn increases strength demands and consequently manufacturing costs. In addition, or alternatively, load-limiting operation may have to be foreseen, such as by pitching of the blade, in order not to exceed the blade's stress limits. Such load-limiting operation reduces power yield.

In an attempt to address the above problems, international patent publication No. WO 2008/089765 proposes an X-shaped reinforcing member connected to girders internally in the blade. The girders extend orthogonally to a chord line of the blade. The X-shaped reinforcing member, however, adds weight and manufacturing costs.

SUMMARY OF THE INVENTION

On the above background it is an object of preferred embodiments of the invention to provide a wind turbine blade with a structure for alleviating the effects of shear distortion in a weight-saving and cost-efficient manner. It is a further object of preferred embodiments of the invention to provide an inexpensive method of manufacture of the wind turbine blade which can conveniently be implemented in existing manufacturing facilities.

In a first aspect the invention provides a wind turbine blade comprising:
- a root end and a tip end;
- a leading edge and a trailing edge, wherein the leading edge and the trailing edge extend in a lengthwise direction of the blade from the root end of the blade towards the tip end;
- a suction side shell and a pressure side shell;
- at least one airfoil defined by the suction side shell and the pressure side shell, the airfoil having a chord line interconnecting the leading edge and the trailing edge in a chordwise direction of the blade;
- at least a first and a second shear web, each of which interconnects the suction side shell and the pressure side shell;

wherein, in a chordwise cross section of the blade:
- the first and second shear webs are arranged at a mutual distance in the chordwise direction of the blade;
- at least one of the first and second shear webs is non-orthogonal to the chord line in said chordwise cross section;
- the first and second shear webs are non-parallel.

The first and second shear webs are hence arranged in a V-configuration when seen in the chordwise cross section of the blade. The at least one of the shear web which is non-orthogonal to the chord line preferably forms an angle of between 40° and 85°, more preferably between 50° and 80° with respect to the chord line. The first and second shear webs are arranged at a mutual distance along their entire height when seen in the thickness direction of the blade, i.e. a direction orthogonal to the chordwise direction in the chordwise cross section of the blade. Thus, the first and second shear webs do not intersect one another in the chordwise cross section of the blade.

It has surprisingly been found that the substantially triangular configuration brought about by the provision of at least one of the shear webs in a non-orthogonal extension relative to the chord line and the non-parallel layout of the shear webs result in a stable design achieving improved resistance with respect to shear distortion. At the same time, the blade can be manufactured at low cost, as the need for further X-shaped reinforcement members, grid structures or the like may be obviated. Thus, standard manufacturing practice of providing pressure side and suction side shells in respective mould halves may be employed, as the shear webs may be attached to one shell prior to closing the mould. As further X-shaped reinforcement members, grid structures and the like can be dispensed with, the wind turbine blade according to the present invention provides an inexpensive and weight-saving structure for mitigating shear distortion.

In the present context, the notion of non-orthogonal and non-parallel refers to the configuration of the shear webs in an unloaded state, i.e. when the blade is at rest and neither subject to aerodynamic loads nor to gravity forces inducing shear loads in the chordwise direction.

Each of the shear webs preferably extends along a straight line between the suction side and pressure side shells. In other words, the shear web themselves are essentially I-shaped. The first and second shear webs preferably form a V-shape when seen in the chordwise cross section of the blade with one end of the "V" attaching to the suction side shell and the other end of the "V" attaching to the pressure side shell. Thus, not only does invention obviate the need for an X-shaped reinforcing member or a grid structure or the like in addition to the shear webs; indeed, the shear webs themselves do not form a cross or X-configuration when seen in the chordwise cross section. The shear webs thus form respective straight legs of the "V". Design and manufacturing complexity is thereby reduced.

In order to enhance shear distortion mitigation, both of the first and second shear webs may be non-orthogonal to the chord line. Thus, each of the first and second shear webs forms an acute angle as well as an obtuse angle with respect to the chord line. As the first and second shear webs are arranged in a V configuration, the acute angle of a first one of the shear webs extends in a direction opposite to the acute angle of a second one of the shear webs. In other words, the first and second shear webs may preferably be inclined in opposite directions relative to the thickness direction of the airfoil, with one of the first and second shear webs leaning towards the leading edge of the blade and the other one of the first and second shear webs leaning towards the trailing edge.

In the lengthwise direction of the blade, i.e. the direction from the root towards the tip of the blade, the first and second shear webs preferably extend continuously throughout at least 90% of the length of the blade, most preferably along the entire length of the blade. At blade sections, at which alleviation of shear distortion is not of concern, notably at the outer 50% of the length of the blade when measured from the root towards the tip, the first and second shear webs may extend substantially orthogonally to the chord line and/or in a substantially mutually parallel manner. The first and second shear webs preferably extend non-orthogonally to the chord line and non-parallel relative to each other at one or more lengthwise positions between 5% and 50% of the length of the blade when measured from the root towards the tip, most preferably at lengthwise positions between 10% and 30%, and/or at one more lengthwise positions, at which the thickness-to-chord ratio of the airfoil is at least 25%, preferably at least 30%. At such lengthwise positions, the loads incurring shear distortion are more prominent than at other lengthwise positions due to the increased lever conferred by the thickness of the blade. Further, gravity-driven edgewise loads as well as flapwise loads potentially conferring shear distortion are higher near the root of the blade than towards the tip.

In one embodiment of the invention, the first and second shear webs preferably extend non-orthogonally to the chord line and non-parallel relative to each other at the lengthwise position, at which the blade has its maximum chord, given that blade loads, including those conferring shear distortion, have been found to be relatively high at the maximum chord position where the blade typically also has a relatively high thickness-to-chord ratio.

At lengthwise positions of the blade prone to shear distortion, the aerodynamic profile of the airfoil may be truncated at the trailing edge. Truncated trailing edge airfoils may provide a compromise between structural requirements and aerodynamic performance at blade positions at which the relative velocity of the blade relative to the wind is relatively low, i.e. at low radius positions. However, a blade section having a truncated trailing edge is not as structurally stable as a blade section with a sharp trailing edge which may lead to shear distortion. Thus the first and second shear webs may advantageously provide the V-configuration as per the present invention at airfoil sections having a truncated, i.e. flatback trailing edge to mitigate the effects of shear distortion.

For weight reduction and material-saving purposes as well as with a view to facilitating manufacture, the shear webs may extend substantially orthogonally to the chord line and/or substantially mutually parallel along the inner 5-10% of the length of the blade when measured from the tip towards the root and/or along the outer 50-70% of the length of the blade.

One or more further shear webs may be provided in the blade in addition to the first and second shear webs. For example, a third shear web may be provided at a chordwise position closer to the trailing edge than the first and second shear webs. The third shear web may extend substantially orthogonally to the chord line. The provision of such one or more further shear webs enhances stability of the blade. As shear distortion is more likely to occur towards the leading edge of the blade than towards the trailing edge due to the thickness distribution of the blade, the first and second shear webs are preferably arranged closer to the leading edge than the third shear web. The third shear web may thus be provided with the particular aim of enhancing mechanical stability towards the trailing edge of the blade.

In order to save material and hence manufacturing costs, and with a view keeping the weight of the blade at a minimum, the third shear web may be shorter, in the lengthwise direction of the blade, than the first and second shear webs. For example, the third shear web may be provided at one or more lengthwise sections between 5% and 85% of the length of the blade when measured from the root towards the tip, preferably between about 10% and about 70%. Like the first and second shear webs, the third shear web preferably extends continuously along its entire length.

Further shear webs may be provided in addition to the first and second, and optionally third, shear webs. For example, with a view to enhancing shear distortion resistance, the first and second shear webs may be complemented by one or more further shear webs, all or some of which extend non-orthogonally to the chord line, and all of which extend along a straight line between the suction side and pressure side shells of the blade, and none of which intersect one another. For example, two further shear webs may be provided, so that the first and second shear webs and the two further shear webs form a W-configuration in the chordwise cross section of the blade.

The shear webs may be made from a fibre material, such as glass or carbon fibres, impregnated with a resin. The suction side and pressure side shells of the blade may likewise comprise fibre-reinforced structure, comprising glass and/or carbon fibres.

Spar caps may be provided embedded in or attached to the suction side and pressure side shells at attachment zones for the shear webs. The spar caps may provide enhanced strength in a manner known per se. The spar caps may, e.g., be made from a plurality of strips of fibre-reinforced polymer arranged in a stack. Preferably the strips of fibre-reinforced polymer are pultrusions, preferably carbon-fibre pultrusions. The first and second shear webs thus preferably attach to the suction side and pressure side shells at the spar caps.

The first and second shear webs attach to the suction side and pressure side shells at attachment zones, also referred to herein as attachment points. The V configuration of the first and second shear webs results in that a first chordwise distance between attachment points of the first and second shear webs at the suction side shell is different from a second chordwise distance between attachments points of the first and second shear webs at the pressure side shell.

In order to increase buckling resistance of the blade, the shear webs may attach to respective spar structures at the suction side and/or pressure side shells of the blade. Alternatively, both of the first and second shear webs may attach to a common spar structure at at least one of the shells of the blade. The spar structures may comprise spar caps. The provision of a common spar structure may reduce material consumption, labour and, hence, manufacturing costs. Yet, the provision of separate spar structures may increase buckling resistance as the spar caps are spaced apart in the chordwise direction. As the suction side of the blade is more in compression during use than the pressure side shell, a desirable balance between buckling resistance and reduction of manufacturing costs may be achieved by the provision of a common spar cap for the first and second shear webs at the pressure side shell of the blade and separate spar caps for the shear webs at the suction side shell of the blade. In order to conveniently accommodate a common spar structure, such as in particular a common spar cap at the pressure side shell and separated spar structures, such as in particular separated spar caps for the shear webs at the suction side shell, the distance between the attachment points of the first and second shear webs at the suction side shell of the blade may be larger than the distance between the attachment points of the shear webs at the pressure side shell of the blade.

As the distance between the first and second shear webs' attachment points at the suction side shell is preferably larger than the distance of the attachment points at the pressure side shells, the shear webs may, during manufacture of the blade, rest stably as an inverted V on the suction side shell before an upper mould part comprising the pressure side shell is moved onto a lower mould part accommodating the suction side shell, to which the shear webs are attached.

With a view to balancing manufacturing costs, strength and geometrical requirements and constraints, a chordwise length of the spar structure at the suction side may be greater than a chordwise length of the spar structure at the pressure side. Alternatively, a chordwise length of the spar structure at the pressure side may be greater than a chordwise length of the spar structure at the suction side. For example, in a V configuration of the shear webs, the chordwise length of a single spar cap at the pressure side shell may be greater than a chordwise length of each of two separated spar caps at the suction side shell. In a W configuration of the shear webs, one or both of the shells may comprise a plurality of spar caps having different lengths.

In the present context, the chordwise length of the spar structure, such as in particular of spar caps, is to be understood as the length of the spar structure parallel to a tangent to the shell, in which the spar cap is comprised. Thus, the chordwise length of the spar cap may be larger than its projection onto the chord line if it—as it will most often be the case—is provided at a chordwise position, at which the shell is non-parallel to the chord line.

In order to enable the use of standard spar caps, such as pultruded elements of standard widths, two separated first spar caps may be provided at the suction side shell, and two second separated spar caps may be provided at the pressure side shell, with the first and second shear webs attaching to respective ones of the first spar caps at the suction side shell and to respective ones of the second spar caps at the pressure side shell.

In an alternative embodiment, the spar structures comprise two separated first spar caps at one of the suction side and pressure side shells and a single second spar cap at the other one of the suction and pressure side shells, with the first and second shear webs attaching to respective ones of the first spar caps at one of the shells and to the single second spar cap at the other shell. The provision of a single, i.e. common single second spar cap may reduce manufacturing and material costs.

The first and second spar caps may be of substantially equal length, or the chordwise length of the first spar cap may be substantially equal to half a chordwise length of the second spar cap. Thus, spar caps comprising, e.g., pultruded elements of a standard width may be employed be arranging two or more such pultruded elements next to one another in the chordwise direction in one or both of the shells of the blade.

For example, in an embodiment in which the shear webs are arranged in a W configuration, or in embodiments comprising a third shear web in addition to the first and second shear webs, the spar structures may comprise two separated first caps at each of the suction side and pressure side shells, and two separated second caps at the other one of the suction side and pressure side shells. At least one of the two separated first and second spar caps may in that case have a chordwise length substantially equal to half a chordwise length of at least another one of the two separated first and second spar caps.

It will thus be appreciated that a combined chordwise length of two separated first spar caps in one of the shells may be substantially equal to a chordwise length of the single second spar cap in the same shell or in a different one of the shells.

The single spar cap may be at the pressure side shell, and the separated spar caps may be at the suction side shell. A desirable balance between buckling resistance and reduction of manufacturing costs may thereby be achieved, having regard to the fact that the suction side of the blade is frequently more in compression during use than the pressure side shell.

As it will be appreciated from the above disclosure, as the first and second shear webs arranged at a mutual distance in the chordwise direction of the blade and do not intersect one another, and by virtue of at least one of the first and second shear webs being non-orthogonal to the chord line and the two shear webs being non-parallel, the first and second shear webs form a V-configuration in the chordwise cross section of the blade.

The present invention accordingly generally provides a wind turbine blade comprising:
   a root end and a tip end;
   a leading edge and a trailing edge, wherein the leading edge and the trailing edge extend in a lengthwise direction of the blade from the root end of the blade towards the tip end;
   a suction side shell and a pressure side shell;
   at least one airfoil defined by the suction side shell and the pressure side shell, the airfoil having a chord line interconnecting the leading edge and the trailing edge in a chordwise direction of the blade;
   at least a first and a second shear web, each of which interconnects the suction side shell and the pressure side shell;
wherein, in a chordwise cross section of the blade the first and second shear webs are arranged in a V-configuration.

In a second aspect, the present invention provides a method for manufacturing the wind turbine blade according to the first aspect of the invention, the method comprising:
   providing the suction side shell and the pressure side shell in respective mould halves;
   bonding the first and second shear webs to one of the suction and pressure side shells, whereby respective ends of the shear webs opposite to ends bonded to said one of the shells remain unattached to the other one of the suction and pressure side shells;

applying an adhesive to said opposite ends of the shear webs and/or to attachment regions for the shear webs at an inner surface of said other one of the shells; and subsequently:

closing the mould to engage the inner surface of said other one of the shells with said opposite ends of the first and second shear webs.

As the shear webs are initially connected to one of the shells and is engaged with the other one as the mould closes, their V configuration may improve stability of the mould halves during manufacture and enhance precision, as they contribute to stabilizing both mould halves. In a preferred embodiment the first and second shear webs are initially bonded to the suction side shell which, during manufacture, is arranged in a lower mould half. Thus, the pressure side shell is arranged in an upper mould half which is moved over and onto the lower mould half. In embodiments, in which the distance between the first and second shear webs' attachment points at the suction side shell is larger than the distance of the attachment points at the pressure side shells, the shear webs may thus during manufacture of the blade rest stably as an inverted V on the suction side shell before an upper mould part comprising the pressure side shell is moved onto a lower mould part.

Prior to the step of closing the mould the method may comprise the further steps of:

interconnecting the first and second shear webs by an elastic structure biasing the shear webs towards one another, and optionally interconnecting the first and second shear webs by a rigid distance piece.

The elastic structure and/or the optional rigid distance piece may remain attached to the first and second shear webs during the step of closing the mould. The elastic structure may, e.g., be provided in the form of a rubber band.

The elastic structure may contribute to ensuring that the first and second shear webs do not drift away from one another under the action of gravity and/or under the action of pressure imparted by the upper mould half when the mould is closed. The rigid distance piece may contribute to ensuring that the first and second shear webs keep their intended distance.

The elastic biasing structure is preferably provided at a position along the height of the shear webs where they are more distant apart than at the position at which the rigid distance piece is provided, as the mutual positions of the shear webs may thereby be more easily controllable.

Generally, in the method according to the invention, the first and second shear webs and the elastic biasing structure may act as an elastic structure which may compensate for shape variations and contribute to ensuring uniformly thin bond lines between the shear webs and the upper shell.

BRIEF DESCRIPTION OF THE DRAWINGS

Embodiments of the invention will now be further described by reference to the accompanying drawings, in which.

DETAILED DESCRIPTION OF THE DRAWINGS

Figure 1:
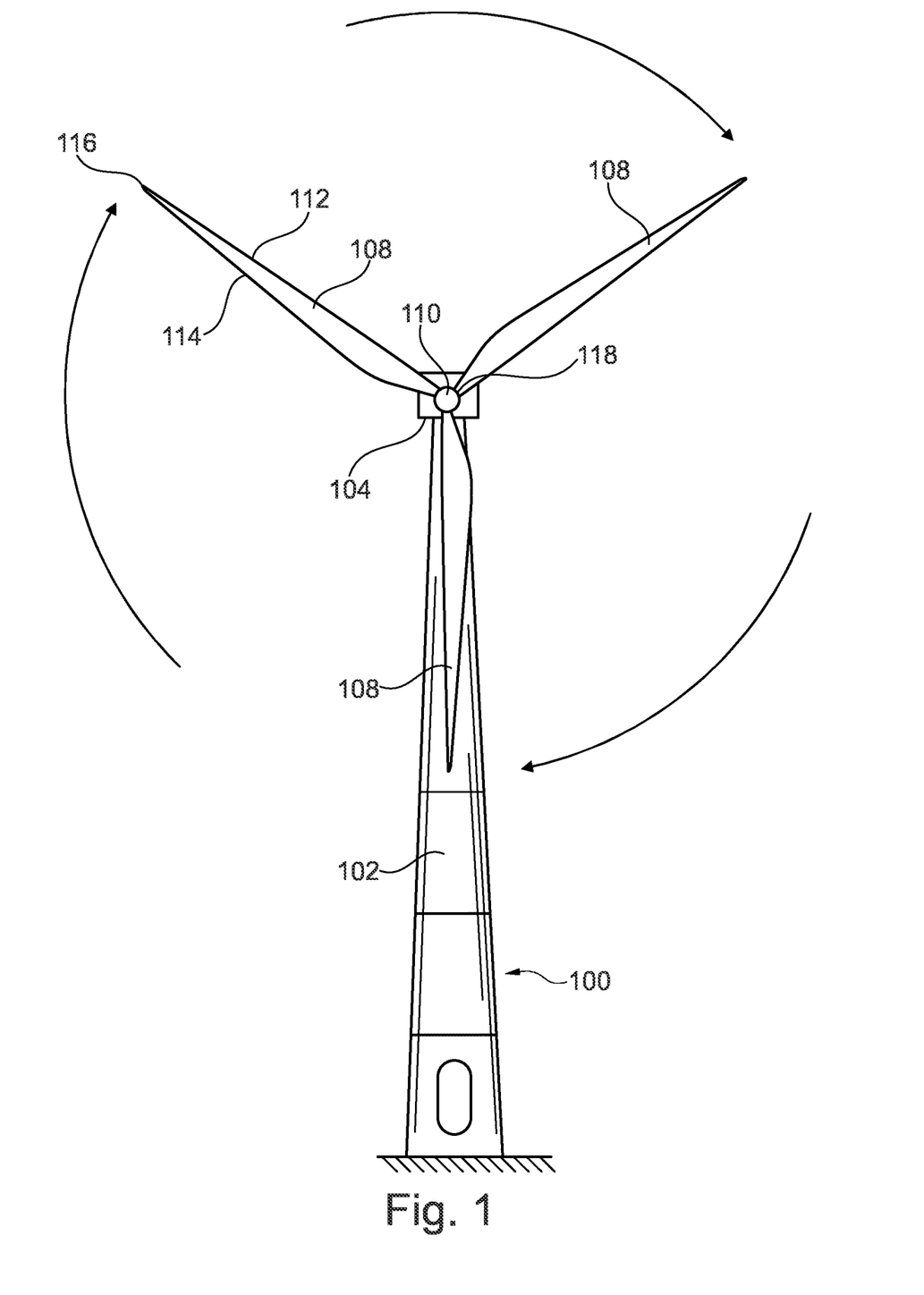
FIG. 1 generally illustrates a horizontal-axis wind turbine including three blades according to the present invention.
Figure 2:
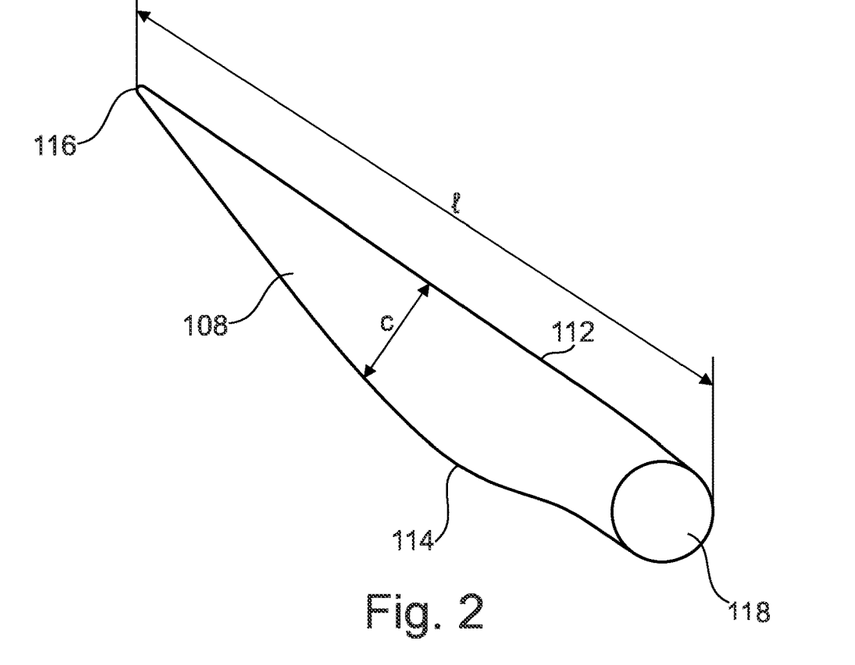
FIG. 2 generally illustrates a wind turbine blade according to the present invention.

FIGS. 1 and 2 generally illustrate a horizontal-axis wind turbine 100 including three blades 108 according to the present invention (FIG. 1) and a blade 108 (FIG. 2). The blades 108 constitute a rotor of the wind turbine connected to a main shaft at a hub 110. The wind turbine 100 includes a tower 102 and a nacelle 104 at the upper end of the tower. Each blade 108 has a root end 118, a tip end 116, a leading edge 112 and a trailing edge 114. The blade has a total length l from the root 118 to the tip 116. At any position between the root 118 and the tip 116, the chord length c is defined as the shortest straight line distance between the leading edge 112 and the trailing edge 114. As shown in FIG. 2, the chord length may vary along the length of the blade to take into account the fact that the aerodynamics vary along the length of the blade. Likewise the blade may be twisted along its length. The aerodynamic profile of the blade in a chordwise cross sectional view may vary along the length of the blade. At the root 118, the profile is typically circular, and near the root the blade undergoes a transition into an aerodynamic profile. At its root 118 the blade may be mounted to a pitch-regulating device for controlling the pitch of the blade, i.e. its rotation around a longitudinal axis extending in the lengthwise direction of the blade.

In operation flapwise loads, mainly conferred by aerodynamic loads, and edgewise loads, mainly conferred by gravity, generate transverse shear forces as generally indicated by arrows 142 and 144 in FIG. 3 which shows a chordwise cross-sectional view through a prior art wind turbine blade. The blade has a suction side 120 and a pressure side 124 defined by a suction side shell 122 and a pressure side shell 126, respectively. As illustrated, the shells 122 and 126 are joined at the leading and trailing edges 112 and 114. Internally within the blade, the suction side shell 122 and the pressure side shell 126 are interconnected by shear webs 128 and 130 extending in a thickness direction of the blade, i.e. transverse to the chordwise direction. At the attachment zones of the shear webs 128 and 130 to the shells 122 and 126, the shells are provided with spar caps 134 and 136. The transverse shear forces 142 and 144 occur in consequence of intrinsic asymmetries of the blade geometry and its mass distribution. The transverse shear forces confer bending moments in the chordwise cross sectional plane illustrated in FIG. 3, whereby the spar caps 134 and 138 and/or the shear webs 128 and 130 may be distorted. These effects are generally referred to herein as shear distortion.

Figure 4:
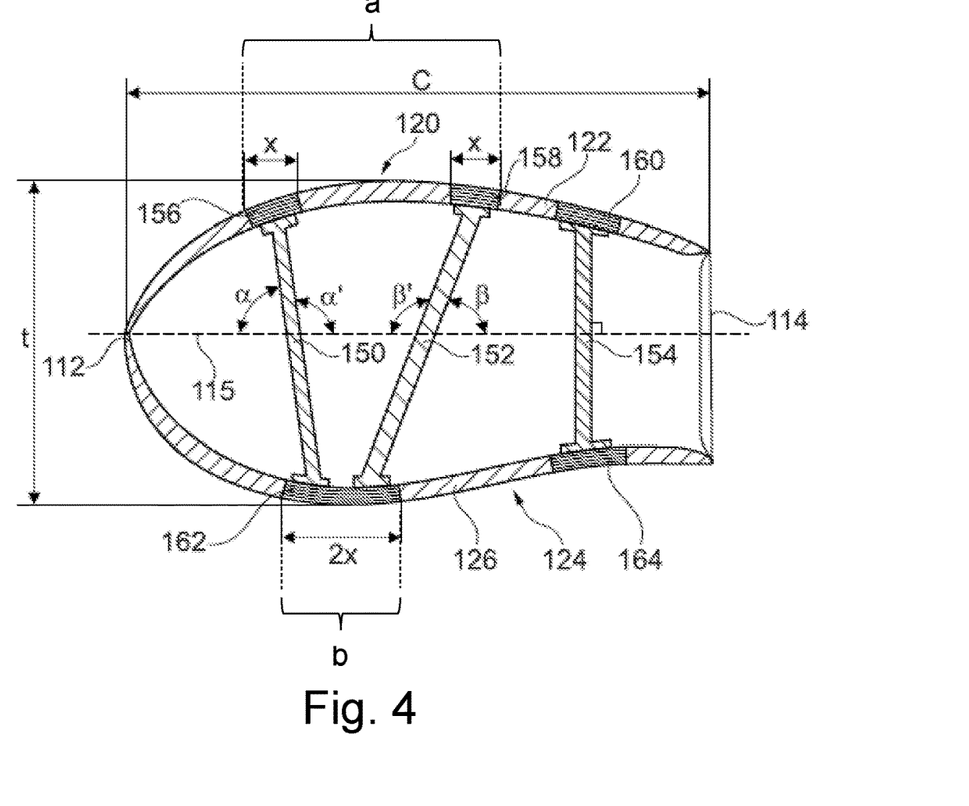
FIG. 4 illustrates a first embodiment of a wind turbine blade according to the present invention seen in a chordwise cross section through the blade.

In order to mitigate shear distortion, the present invention provides a wind turbine blade according to the accompanying claims. In one embodiment as illustrated in FIG. 4, the blade comprises, in a cross-sectional view, first and second shear webs 150, 152 arranged in a V configuration. The blade has a chord length c. The shortest straight line distance between the leading edge 112 and the trailing edge 114 is generally referred to as the chord length. The chord line 115 is defined as the straight line defining the chord length.

As shown in FIG. 4, the trailing edge 114 may be truncated, i.e. it the airfoil section does not form a sharp point at the trailing edge, but instead the airfoil has a flatback trailing edge. The chord length c is taken from the middle point of the flatback trailing edge.

Whereas in the prior art example of FIG. 3, the shear webs 128 and 130 are perpendicular to the chord line and hence parallel, according to the present invention, as illustrated in the embodiment of FIG. 4, at least one of the first and second shear webs 150, 152 is non-orthogonal to the chord line 115, resulting in a V configuration of the shear webs. In the exemplary embodiment of FIG. 4, both the first and second shear webs 150, 152 are non-orthogonal to the chord line 115. The first shear web 150 leans towards the leading edge 112 and forms an acute angle α with respect to the chord line 115 as well as an opposite obtuse angle α'. The second shear web 152 leans towards the trailing edge 114 and forms an acute angle β with respect to the chord line 115, the angle β being thus opposite to the angle αx of the first shear web 150. The obtuse angle of the second shear web 152 with respect to the chord line 115 is denoted β' in FIG. 4.

The first and second shear webs 150 and 152 attach to a common first spar cap 162 embedded in the pressure side shell 126 and to respective second spar caps 156 and 158 embedded in the suction side shell 122. In other embodiments, separate first spar caps for the first and second shear webs 150, 152 are provided in place of the first common spar cap 162. In yet other embodiments, a common spar cap at the suction side shell 122 may be provided in place of the second spar caps 156 and 158.

As indicated, the combined chordwise lengths of the second spar caps 156 and 158 are substantially equal to the chordwise length of the first common spar cap 162. The first common spar cap 162 may conveniently comprise two spar caps of a standard width arranged next to one another in the chordwise direction of the pressure side shell 126, whereas each of the second spar caps 156 and 158 may comprise one such spar cap of a standard width. The use of spar caps, such as pultruded elements, of standard widths contributes to keeping manufacturing costs at a minimum. In the present context, the notion of chordwise lengths of the spar caps is to be understood as the length of the spar cap parallel to a tangent to the shell, in which the spar cap is comprised. Thus, the chordwise lengths of the spar caps may be larger than their projected lengths x and 2x onto the chord line indicated in FIG. 4.

A third shear web 154 is provided towards the trailing edge 114 of the blade, with the third shear web 154 attaching to the shells 122 and 126 at respective spar caps 160 and 164. In the exemplary embodiment shown in FIG. 4, the third shear web 154 is perpendicular to the chord line 115.

As shown, the embodiment of FIG. 4 includes respective spar structures a and b at the suction side shell 122 and the pressure side shell 126. At the suction side shell 122 the spar structure a comprises the spar caps 156 and 158 as two separated spar caps. At the pressure side shell 126 the spar structure b comprises a single spar cap 162. The spar cap 162 may comprise elements of a standard width, such as pultruded elements, identical to those comprised in the spar caps 156 and 158. Thus, at spar cap 162 two such elements may be arranged next to one another, resulting in the length of spar cap 162 being twice the length of each one of the respective spar caps 156 and 158.

Figure 5:
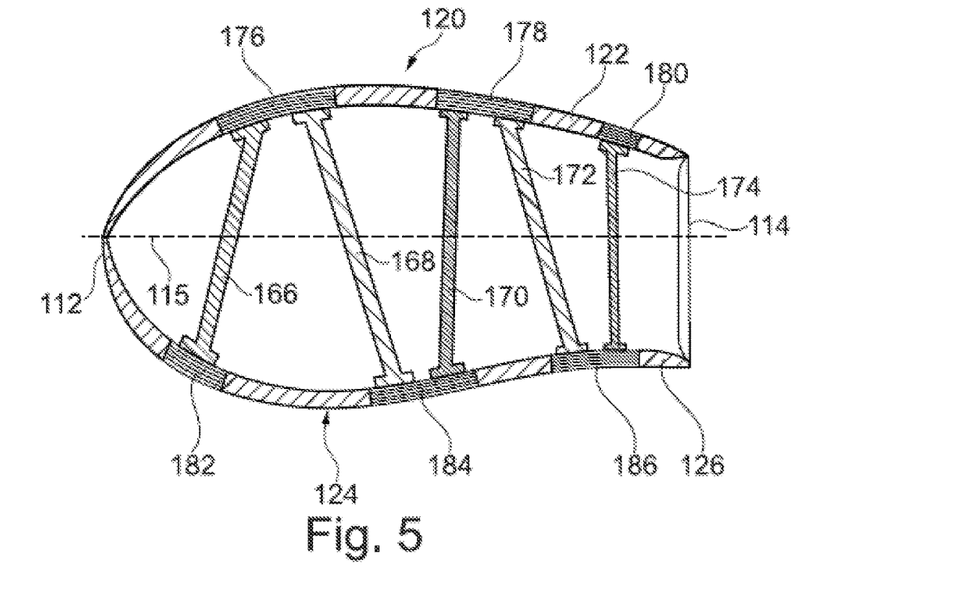
FIG. 5 illustrates a second embodiment of a wind turbine blade according to the present invention seen in a chordwise cross section through the blade.

FIG. 5 illustrates a second embodiment of a blade according to the invention, comprising, in addition to first and second shear webs 166 and 168 arranged in a V configuration, two further shear webs 170 and 172, likewise arranged in a V configuration. As illustrated, the shear webs 166, 168, 170 and 172 form a W configuration and attach to the suction side shell 122 at common spar caps 176 and 178 and to the pressure side shell 126 at spar caps 182, 184 and 186. Like in the embodiment of FIG. 4, a third shear web 174 extending orthogonally to the chord line 115 is provided in addition to the V- and W-configured shear webs 166, 168, 170 and 172.

In the embodiment shown in FIGS. 4 and 5 all of the shear webs 150, 152, 166, 168, 170, 172 and 174 are essentially I-shaped and extend along an essentially straight line between the suction side and pressure side shells 126 and 122 without intersecting one another.

The embodiments of the blade according to the invention illustrated in FIGS. 4 and 5 may be manufactured according to the method according to the second aspect of the invention. An embodiment of the method will hereinafter be described by reference to FIGS. 6 and 7.

Figure 6:
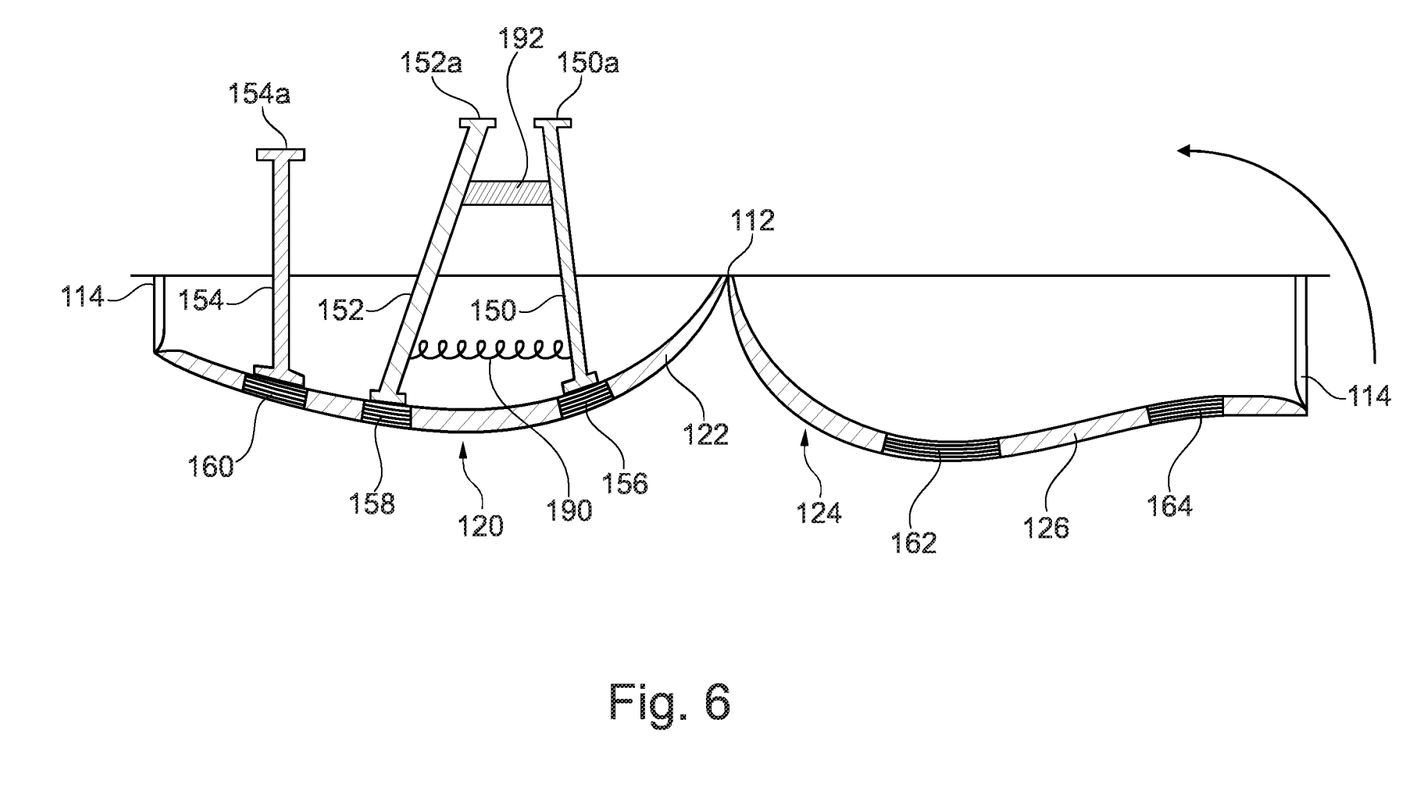
FIG. 6 illustrates a manufacturing stage of the blade according to the embodiment of FIG. 4.

As shown in FIG. 6, at a manufacturing stage of the blade 108 according to the invention, the suction side shell 122 and pressure side shell 126 are provided in respective halves of a mould which may be mutually hinged at the position of the leading edge 112. The suction side shell 122 and the pressure side shell may be manufactured by a manufacturing step known per se, in which reinforcement fibres are laid up, impregnated with a resin and cured. The fibres and resin may be provided as prepregs, or alternatively non-impregnated dry fibres may be laid up and infused with a resin.

Prior to closing the mould by rotating the pressure side mould half, i.e. the "upper" mould half as indicated by an arcuate arrow in FIG. 6, the first and second shear webs 150, 152, as well as the optional third shear web 154, are bonded, e.g. by an adhesive, to the suction side shell, i.e. the "lower" shell, at attachment points at the respective spar caps 156, 158 and 160. The first and second shear webs 150, 152 are interconnected by an elastic structure 190, such as a rubber band, as well as by a rigid distance piece 192. The elastic structure 190 contributes to ensuring that the first and second shear webs 150, 152 do not drift away from one another under the action of gravity and/or under the action of pressure imparted by the upper mould half for the pressure side shell 126 when the mould is closed. The rigid distance piece 192 contributes to ensuring that the first and second shear webs keep their intended distance.

Also prior to closing the mould, adhesive is applied at the leading and trailing edges 112, 114 along the length of the blade, as well as at upper surfaces 150a, 152a and 154a of the shear webs 150, 152, 154. Alternatively or additionally to providing adhesive at the upper surfaces 150a, 152a, 154a of the shear webs, adhesive may be applied at attachment zones of the spar caps 162 and 164. After application of adhesive for bonding the suction side shell 124 and the pressure side shell 126 together the mould is closed for bonding the shells together.

Figure 7:
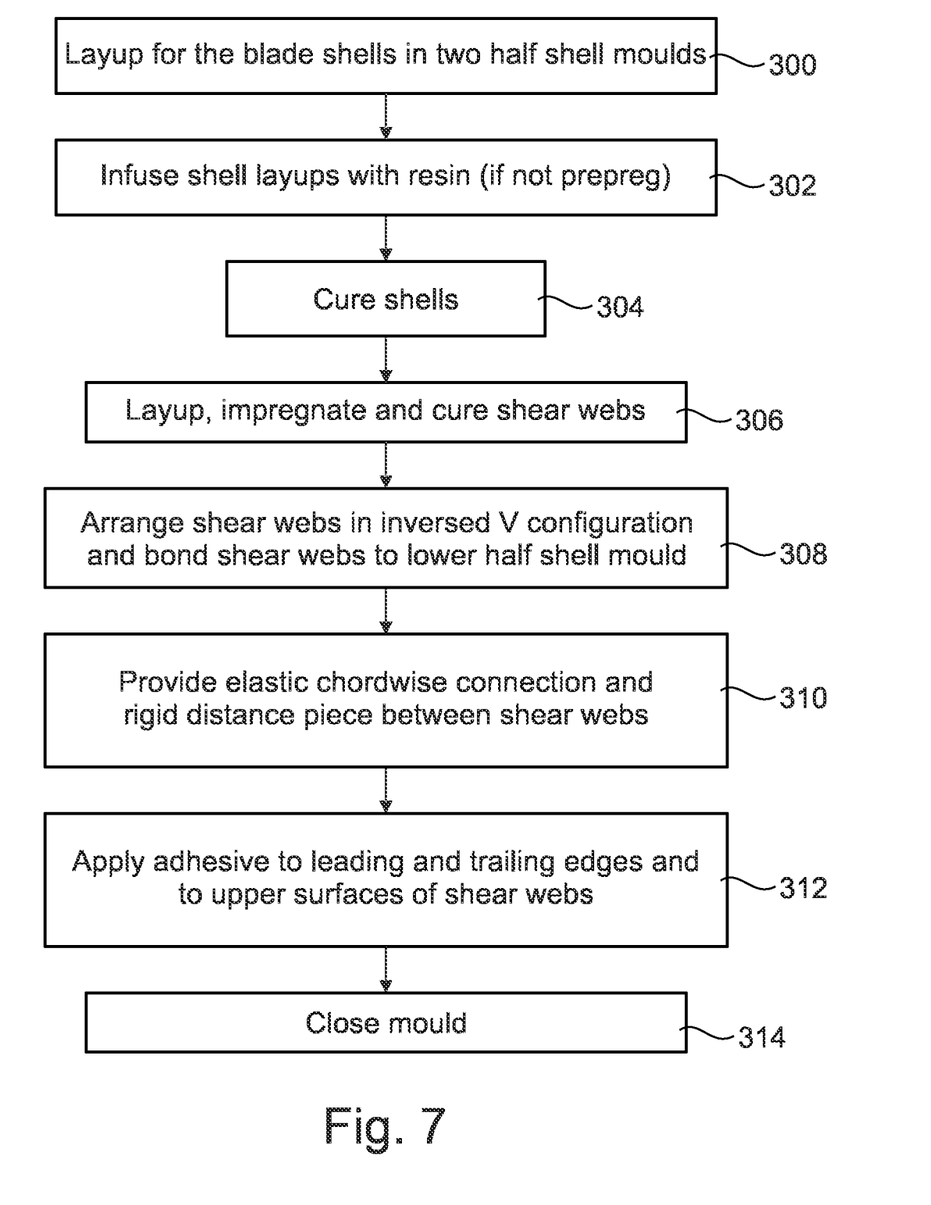
FIG. 7 is a flowchart including steps of a method of manufacture according to the invention.

FIG. 7 is a flowchart including steps of a method of manufacture according to the invention. At step 300, fibres for the blade shells are laid up in two half shell moulds. Next, at step 302, a resin is infused and cured at step 304 to form the suction side and pressure side shells. If the fibres are provided in the form of prepregs, the step of infusing a resin is omitted. At step 306 the shear webs are laid up by providing a fibrous material embedded in a resin which is cured. Step 306 may occur at any stage before step 308, i.e. before any one of steps 300, 302 and 304, or at the same time as any one of steps 300, 302 and 304.

At step 308 the shear webs are arranged in an inversed V configuration and bonded to the lower half shell as exemplified above by reference to the embodiment of FIG. 6. At step 310 the elastic structure and rigid distance piece are provided to interconnect the shear webs. Step 310 may alternatively occur prior to step 308 in order to minimize the amount of work to be carried out to the shear webs once arranged in the lower half mould. At step 312, adhesive is applied to the leading and trailing edges along their length as well as to the upper surface of the shear webs. Subsequently, the mould is closed.

Once the adhesive has cured, the mould is opened, and the blade is removed from the mould.

The invention claimed is:

1. A wind turbine blade comprising:
 a root end and a tip end;
 a leading edge and a trailing edge, wherein the leading edge and the trailing edge extend in a lengthwise direction of the blade from the root end of the blade towards the tip end;
 a suction side shell and a pressure side shell;
 at least one airfoil defined by the suction side shell and the pressure side shell, the airfoil having a chord line interconnecting the leading edge and the trailing edge in a chordwise direction of the blade;
 at least a first and a second shear web, each of which interconnects the suction side shell and the pressure side shell;
 wherein, in a chordwise cross section of the blade:
  the first and second shear webs are arranged at a mutual distance in the chordwise direction of the blade;
  at least one of the first and second shear webs is non-orthogonal to the chord line in said chordwise cross section;
  the first and second shear webs are non-parallel; and
 wherein the first and second shear webs are arranged in a V-configuration when seen in the chordwise cross section of the blade at one or more lengthwise positions between 5% and 50% of the length of the blade when measured from the root towards the tip.

2. The wind turbine blade according to claim 1, further comprising spar structures at the suction side and pressure side shells; wherein
 the first and second shear webs attach to the suction side and pressure side shells at the spar structures at respective attachment points; and
 a first chordwise distance between attachment points of the first and second shear webs at the suction side shell is different from a second chordwise distance between attachments points of the first and second shear webs at the pressure side shell.

3. The wind turbine blade according to claim 2, wherein:
 a chordwise length of the spar structure at the suction side shell is greater than a chordwise length of the spar structure at the pressure side shell; or
 a chordwise length of the spar structure at the pressure side shell is greater than a chordwise length of the spar structure at the suction side shell.

4. The wind turbine blade according to claim 2, wherein:
 said spar structures comprise two separated first spar caps at the suction side shell and two second separated spar caps at the pressure side shell; and
 the first and second shear webs attach to respective ones of the first spar caps at the suction side shell and to respective ones of the second spar caps at the pressure side shell.

5. The wind turbine blade according to claim 2, wherein:
 said spar structures comprise two separated first spar caps at one of the suction side and pressure side shells and a single second spar cap at the other one of the suction and pressure side shells; and
 the first and second shear webs attach to respective ones of the first spar caps at one of the shells and to the single second spar cap at the other shell.

6. The wind turbine according to claim 2, wherein said spar structures comprise:
 two separated first caps at one of the suction side and pressure side shells;
 two separated second caps at the other one of the suction side and pressure side shells;
 wherein at least one of the two separated first and second spar caps has a chordwise length equal to half a chordwise length of at least another one of the two separated first and second spar caps.

7. The wind turbine blade according to claim 5, wherein a combined chordwise length of the two separated first spar caps is equal to a chordwise length of the single second spar cap.

8. The wind turbine blade according to claim 5, wherein said single spar cap is at the pressure side shell.

9. The wind turbine blade according to claim 1, wherein the first and second shear webs are at a first mutual distance in the vicinity of the suction side shell and at a second mutual distance in the vicinity of the pressure side shell, wherein the first mutual distance is larger than the second mutual distance.

10. The wind turbine blade according to claim 1, further comprising a third shear web which:
 when seen in the chordwise cross section of the blade is arranged at a chordwise position closer to the trailing edge than the first and second shear webs; and which extends orthogonally to the chord line.

11. The wind turbine blade according to claim 1, wherein any one of the shear webs is orthogonal to the chord line at lengthwise positions above 50% of the length of the blade when measured from the root towards the tip.

12. The wind turbine blade according to claim 1, wherein the first and second shear webs are arranged in a V-configuration at lengthwise positions within the blade, at which the thickness-to-chord ratio of the airfoil is at least 30%.

13. The wind turbine blade according to claim 1, wherein the trailing edge is truncated in said chordwise cross section of the blade.

14. The wind turbine blade according to claim 1, wherein said at least one of the first and second shear webs which is non-orthogonal to the chord line defines an angle of between 50° and 80° with respect to the chord line.

15. A method for manufacturing a wind turbine blade according to claim 1, comprising:
 providing the suction side shell and the pressure side shell in respective mould halves;
 bonding the first and second shear webs to one of the suction and pressure side shells, whereby respective ends of the shear webs opposite to ends bonded to said one of the shells remain unattached to the other one of the suction and pressure side shells;
 applying an adhesive to said opposite ends of the shear webs and/or to attachment regions for the shear webs at an inner surface of said other one of the shells; and subsequently:
 closing the mould to engage the inner surface of said other one of the shells with said opposite ends of the first and second shear webs.

16. The method according to claim 15, further comprising, prior to the step of closing the mould:
 interconnecting the first and second shear webs by an elastic structure biasing the shear webs towards one another, and optionally interconnecting the first and second shear webs by a rigid distance piece, wherein the elastic structure and the optional rigid distance piece remain attached to the first and second shear webs during the step of closing the mould.

17. The wind turbine blade according to claim 1, further comprising at least two separated first spar structures at one of the suction and pressure side shells and at least three separated second spar structures at the other one of the suction and pressure side shells; wherein:
   a first pair of shear webs is configured to attach to a single separated first spar structure on one of the suction and pressure side shells and attach to two separated second spar structures on the other one of the suction and pressure side shells;
   a second pair of shear webs is configured to attach to a single separated first spar structure on one of the suction and pressure side shells and attach to two separated second spar structures on the other one of the suction and pressure side shells, wherein one of the two separated second spar structures used to attach the second pair of shear webs is common to one of the two separated second spar structures used to attach the first pair of shear webs; and
   the first pair of shear webs and the second pair of shear webs are arranged in a W-configuration when seen in the chordwise cross section of the blade.

18. A wind turbine blade comprising:
   a root end and a tip end;
   a leading edge and a trailing edge, wherein the leading edge and the trailing edge extend in a lengthwise direction of the blade from the root end of the blade towards the tip end;
   a suction side shell and a pressure side shell;
   at least one airfoil defined by the suction side shell and the pressure side shell, the airfoil having a chord line interconnecting the leading edge and the trailing edge in a chordwise direction of the blade;
   at least a first and a second shear web, each of which interconnects the suction side shell and the pressure side shell;
   wherein, in a chordwise cross section of the blade:
      the first and second shear webs are arranged at a mutual distance in the chordwise direction of the blade;
      at least one of the first and second shear webs is non-orthogonal to the chord line in said chordwise cross section; and
      the first and second shear webs are non-parallel;
   at least one spar structure at the suction side shell and at least one spar structure at the pressure side shell, wherein:
      the first and second shear webs attach to the suction side and pressure side shells at the spar structures at respective attachment points; and
      a first chordwise distance between attachment points of the first and second shear webs at the suction side shell is different from a second chordwise distance between attachment points of the first and second shear webs at the pressure side shell;
      the spar structures comprise two separated first spar caps at the suction side shell and a single second spar cap at the pressure side shell; and
      the first and second shear webs attach to respective ones of the first spar caps at the suction side shell and to the single second spar cap at the pressure side shell.

* * * * *